(12) United States Patent
Fulton et al.

(10) Patent No.: US 8,185,903 B2
(45) Date of Patent: May 22, 2012

(54) MANAGING SYSTEM RESOURCES

(75) Inventors: Mike Stephen Fulton, Maple Ridge (CA); Mark Graham Stoodley, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1124 days.

(21) Appl. No.: 11/956,167

(22) Filed: Dec. 13, 2007

(65) Prior Publication Data

US 2009/0158288 A1    Jun. 18, 2009

(51) Int. Cl.
*G06F 9/46* (2006.01)

(52) U.S. Cl. .................. 718/103; 718/102; 718/104

(58) Field of Classification Search ............... 718/102, 718/103, 104
See application file for complete search history.

(56) References Cited

U.S. PATENT DOCUMENTS

| | | | |
|---|---|---|---|
| 5,838,968 A | | 11/1998 | Culbert |
| 6,021,425 A | * | 2/2000 | Waldron et al. ............ 718/103 |
| 7,010,788 B1 | * | 3/2006 | Rehg et al. ................. 718/100 |
| 7,444,638 B1 | * | 10/2008 | Xu ............................. 718/104 |
| 7,779,412 B2 | * | 8/2010 | Lin et al. .................... 718/102 |
| 2003/0061260 A1 | | 3/2003 | Rajkumar |
| 2004/0054997 A1 | | 3/2004 | Katragadda et al. |
| 2006/0026212 A1 | * | 2/2006 | Tsukerman et al. ........ 707/200 |
| 2006/0190938 A1 | * | 8/2006 | Capek et al. ............... 717/161 |
| 2007/0162526 A1 | * | 7/2007 | Printezis et al. ........... 707/206 |
| 2009/0006719 A1 | * | 1/2009 | Traister ....................... 711/103 |
| 2009/0007120 A1 | * | 1/2009 | Fenger et al. .............. 718/102 |

OTHER PUBLICATIONS

G. N. Srinivasa Prasanna, "Compilation of parallel multimedia computations—extending retiming theory and Amdahl's law", Jul. 1997, PPOPP 1997, vol. 32 Issue 7.*
Auerbach et al., "Java Takes Flight: Time-portable Real-time Programming with Exotasks", LCTES'07, Jun. 2007, San Diego, California, 2007 ACM pp. 1-12.

* cited by examiner

*Primary Examiner* — Jennifer To
*Assistant Examiner* — Kevin X Lu
(74) *Attorney, Agent, or Firm* — Yee & Associates, P.C.; David A. Mims, Jr.

(57) ABSTRACT

A computer implemented method, apparatus, and computer usable program product for system management. The process schedules a set of application tasks to form a schedule of tasks in response to receiving the set of application tasks from a registration module. The process then performs a feasibility analysis on the schedule of tasks to identify periods of decreased system activity. Thereafter, the process schedules a set of system management tasks during the periods of decreased system activity to form a prioritized schedule of tasks.

14 Claims, 5 Drawing Sheets

```
import com.ibm.realtime.evaporate.*;
public static void main (string args [ ] ) {
    private final static long us=1000L;
    private final static long ms=1000L*us;

Scheduler scheduler = RealtimeSystem.getScheduler ( ) ;    ⎱ 402
    Schedule s = new Schedule ( ) ;                            ⎰ s.setPeriod (new RelativeTime (1 * ms), new               ⎱ 404
            RelativeTime (20*us) ) ;                          ⎰ s.setDeadline (new RelativeTime (300*us) ) ;   ← 406 s.setEventStyle (com.ibm.realtime.Eventron) ;  ← 408

Dispatchable code = new Dispatchable ( ) {     ⎱
            public void run ( ) {                   ⎬ 410
            }                                       ⎰

};                                                            ⎱ 412
        PeriodicEvent periodicEvent=new PeriodicEvent (code, s) ; ⎰
    try {
            scheduler.register (periodicEvent) ;    ⎱ 414
    } catch (RegistrationException e) {             ⎰
            ;
    } try {
            scheduler.registrationComplete ( ) ;
                                                    ⎬ 416
            } catch (EventFeasibilityException e) {
                    ;
            }
            scheduler.waitOnEvents ( ) ;            ⎬ 418
    }
```

MANAGING SYSTEM RESOURCES

BACKGROUND OF THE INVENTION

1. Field of the Invention

The present invention relates generally to an improved data processing system and in particular, to a computer implemented method and apparatus for resource management. More particularly, the present invention is directed to a computer implemented method, apparatus, and computer usable program product for resource management by interleaving of runtime processing and application execution.

2. Description of the Related Art

A computer system has a finite amount of system resources for running an operating system and other software applications. System resources include, for example, memory and processor resources. Some software applications require varying levels of system resources. For example, a software application executing on the computer system may be virtually inactive and require minimal system resources or fully active and consume in excess of 90 percent of the available system resources. Problems may arise when the performance of necessary system management tasks occurs during the execution of one or more applications on the computer system.

For example, some system management tasks, such as a JAVA™ system management task, includes garbage collection. Traditional garbage collection implementations use a "stop-the-world" approach to recovering heap memory. This approach enables the application to run until the memory heap is exhausted of free memory. At this point, the garbage collection system management task stops all application code, performs a garbage collection, and then allows the application to continue.

Stopping the application code to complete system management tasks is undesirable and may prove problematic. For example, ceasing the execution of software applications that direct flight controls is dangerous and may result in catastrophic consequences.

One currently used solution to address this problem is by performing system management tasks in increments. For example, incremental garbage collectors introduce pause times during garbage collection so that the garbage collection task is more predictable and can occur at set intervals over a period of time. Incremental garbage collection may reduce the number of times that a memory heap is entirely exhausted, or reduce the amount of time that an application is suspended while garbage collection replenishes the memory heap.

However, garbage collection times are predetermined and scheduled independently of the execution of applications. Thus, the execution of applications may still be interrupted by the performance of system management tasks, especially at times when the application consumes large amounts of system resources.

SUMMARY OF THE INVENTION

The illustrative embodiments described herein provide a computer implemented method, apparatus, and computer usable program product for managing system resources. The process schedules a set of application tasks to form a schedule of tasks in response to receiving the set of application tasks from a registration module. The process then performs a feasibility analysis on the schedule of tasks to identify periods of decreased system activity. Thereafter, the process schedules a set of system management tasks during the periods of decreased system activity to form a prioritized schedule of tasks.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
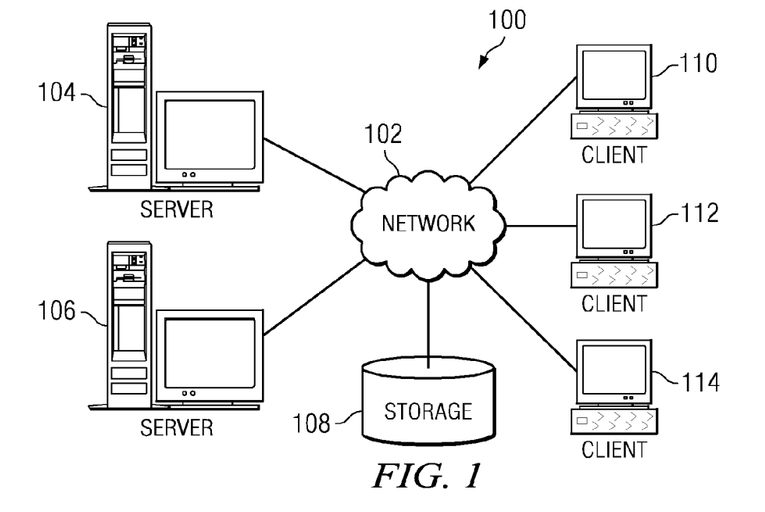
FIG. 1 is a pictorial representation of a network data processing system in which illustrative embodiments may be implemented.
Figure 2:
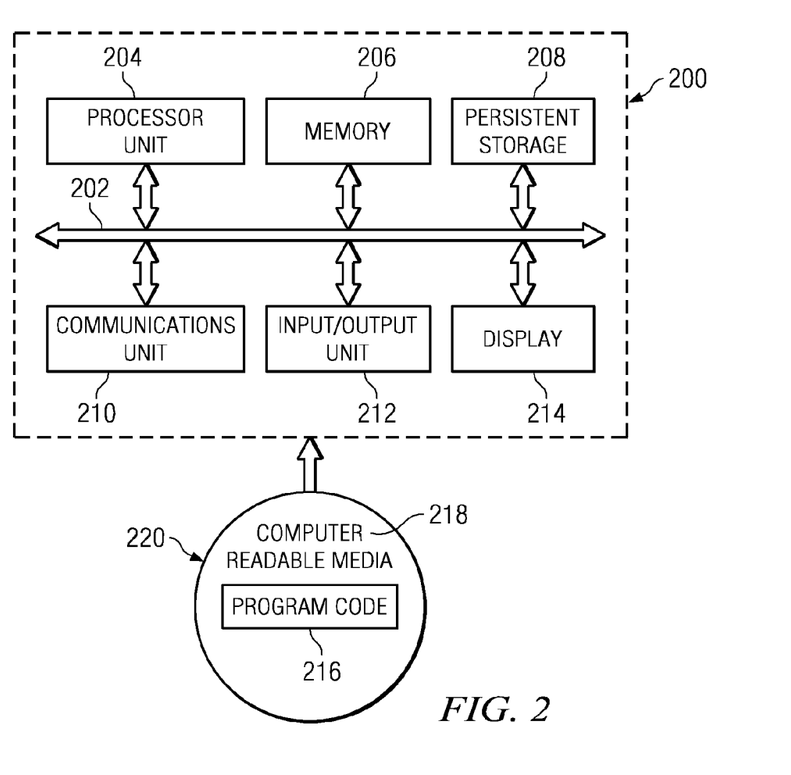
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing system in which illustrative embodiments may be implemented. Network data processing system 100 is a network of computing devices in which embodiments may be implemented. Network data processing system 100 contains network 102, which is the medium used to provide communications links between various devices and computers connected together within network data processing system 100. Network 102 may include connections, such as wire, wireless communication links, or fiber optic cables. The depicted example in FIG. 1 is not meant to imply architectural limitations. For example, data processing system 100 also may be a network of telephone subscribers and users.

In the depicted example, server 104 and server 106 connect to network 102 along with storage unit 108. In addition, clients 110, 112, and 114 are coupled to network 102. Communication between a client and server may occur over a network, such as network 102.

Clients 110, 112, and 114 may be, for example, a personal computer, a laptop, a tablet PC, a network computer, a hardwired telephone, a cellular phone, a voice over internet communication device, or any other communication device or computing device capable of transmitting data. In the depicted example, server 104 provides data, such as boot files, operating system images, and applications to clients 110, 112, and 114. Clients 110, 112, and 114 are coupled to server 104 in this example. Network data processing system 100 may include additional servers, clients, computing devices, and other devices. Clients 110, 112, and 114 are examples of devices that may be hosting operating systems and applications that may concurrently request data processing system resources. Consequently, the data processing resources of clients 110, 112, and 114 may require management in accordance with the illustrative embodiments discussed herein to insure that the various application tasks and system management tasks have sufficient resources for execution.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as, for example, an intranet, a local area network (LAN), a wide area network (WAN), a telephone network, or a satellite network. FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media 218 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, memory 206 or a cache. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

The illustrative embodiments described herein provide a computer implemented method, apparatus, and computer usable program product for managing data processing system resources. Data processing system resources are resources of a data processing system that enables the data processing system to process requests originating from an operating system and applications executing thereon. Data processing system resources include, for example, memory and processor resources.

The process schedules a set of application tasks to form a schedule of tasks in response to receiving the set of application tasks from a registration module. As used herein, a set means one or more. Thus, a set of application tasks may be one or more application tasks. The schedule of tasks is a collection of the application tasks identified by an application programmer for enabling the operation of the application.

The process then performs a feasibility analysis on the schedule of tasks to identify periods of decreased system activity. A feasibility analysis is an analysis of the schedule of tasks for determining whether tasks in the schedule of tasks may be completed within the specified constraints. The constraints may be specified by the database of scheduling policies. Thereafter, the process schedules a set of system management tasks during the periods of decreased system activity to form a prioritized schedule of tasks.

The process schedules the set of application tasks and system management tasks according to task execution details and a database of scheduling policies. The task execution details are details describing the performance parameters of the task. Execution details may include, for example, a period and duration of the task and a tolerance of the task. A tolerance is an acceptable degree of time variation for completing the task.

In the event that asynchronous event tasks are received, tasks in the prioritized schedule of tasks having a lower priority may be preempted to allow the higher priority asynchronous event task to be completed. This preemption may postpone the completion of the lower priority task.

Figure 3:
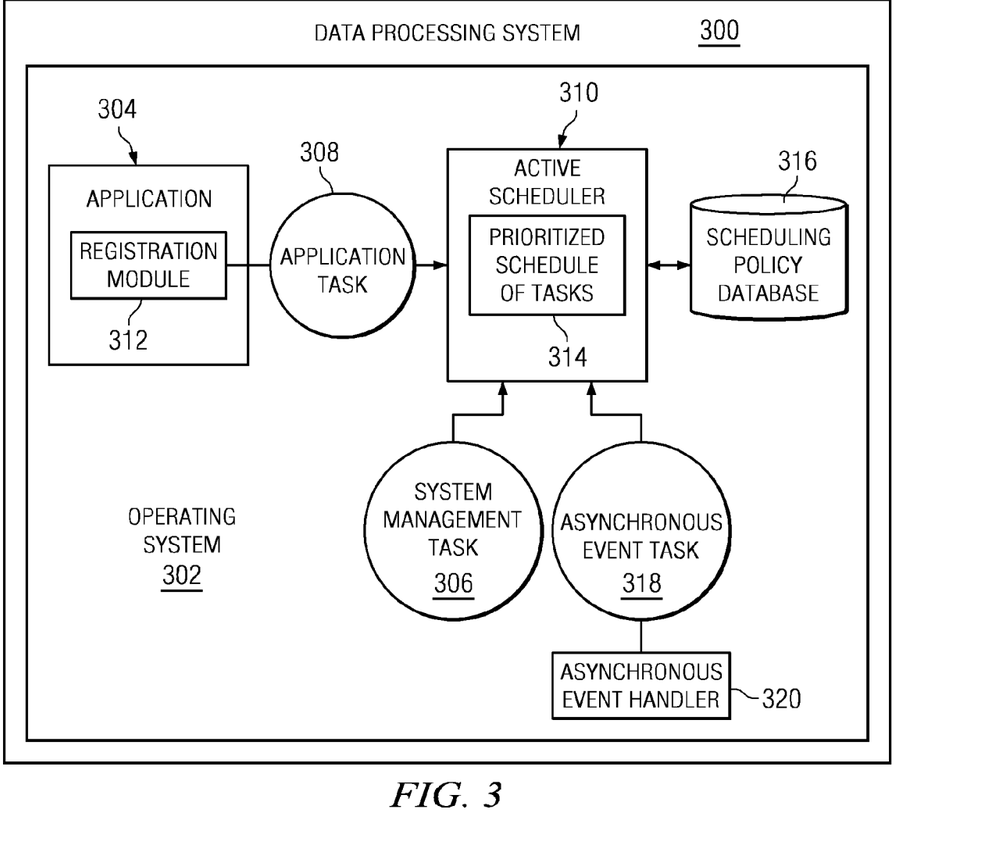
FIG. 3 is a block diagram of a data processing system for managing system resources, in accordance with an illustrative embodiment.

FIG. 3 is a block diagram of a data processing system for managing data processing system resources, in accordance with an illustrative embodiment. Management of resources of data processing system 300 enables software programs, such as operating system 302 and application 304 running concurrently on data processing system 300 access to adequate system resources for operation.

Operating system 302 is software that manages the sharing of the resources of data processing system 300 and provides an interface by which to access those resources. An operating system processes system data and user input, and responds by allocating and managing tasks and internal system resources as a service to users and programs of the system. Operating system 302 is an operating system such as, for example, Microsoft Windows®, MAC OS X®, Linux®, and JAVA™ Runtime Environment. Microsoft Windows is a registered trademark of Microsoft Software Corporation. MAC OS X is a registered trademark of Apple Computer, Inc. Linux is a registered trademark of Linus Torvalds. JAVA is a registered trademark of Sun Microsystems, Inc.

The running of operating system 302 requires data processing system 300 to provide system resources for accommodating system management task 306. System management task 306 is a set of one or more system tasks that are performed to maintain and manage the resources of data processing system 300 and to facilitate the operation of operating system 302 and application 304. System management task 306 may include, without limitation, internal process management tasks, remote file management tasks, and local file management tasks.

Internal process management tasks include, for example, compilation, garbage collection, class unloading, shared library unloading, file flushing, network flushing, data compression/de-fragmentation, and thread/process cleanup. Additionally, remote file management tasks may include processing email, processing system patches, streaming multimedia, and browsing web pages. Examples of local file management tasks include, for example, virus scanning, compression, de-fragmentation, and indexing.

Application 304 is one or more event-based software applications executing on data processing system 300. Application 304 may be, for example, a computer game, a word processing application, a video or music player, a web browser, a JAVA virtual machine, or any other software application. The execution of application 304 requires data processing system 300 to provide system resources for performing application task 308. Application task 308 is a set of one or more subprocesses of application 304 that must be performed in order for application 304 to execute. Application task 308 includes tasks that are known to occur at a specified interval, and which can thus be scheduled. Application task 308 may include, for example, backing up a file system, downloading email messages from an Internet email account, running a virus scan, or any other task that may be associated with application 304.

Application task 308 includes a set of execution details describing the parameters of tasks that form application task 308. Similarly, system management task 306 includes a set of execution details describing the parameters of tasks that form system management task 306. The set of execution details is an execution parameter such as, for example, a period and duration of a task, and a tolerance of a task. A period of a task is a parameter that describes how often the task recurs in a given amount of time. The duration of a task is a parameter that describes how long the task takes to complete. A tolerance is a parameter of a task that describes an acceptable variation of time for starting and/or completing a task. In other embodiments, other relevant execution details may be included within application task 308.

System management task 306 and application task 308 are registered with active scheduler 310. Active scheduler 310 is a scheduling component of operating system 302 for scheduling the execution of system management task 306 and application task 308. In particular, upon receiving system management task 306 and application task 308, active scheduler 310 creates a schedule of all tasks. The schedule of tasks may be, for example, a list or database of tasks enumerating the various execution parameters associated with each task.

In this illustrative example, application 304 includes registration module 312. Registration module 312 is a software component for registering application task 308 with active scheduler 310. Registration module 312 is a framework for collecting execution details of application task 308. An illustrative example of software code for implementing registration module 312 is presented in FIG. 4, below. In a non-limiting embodiment, registration module 312 may be implemented as a class library written in an object oriented programming language. The object oriented programming language may be, for example, JAVA.

Once application task 308 is registered, active scheduler 310 creates a schedule of tasks that includes system management task 306. Application task 308 and system management task 306 are tasks whose execution can be predicted and thus scheduled. For example, where application 304 is an antivirus program, application task 308 may be the updating of virus definitions. The execution of the virus definition update may occur at predictable, pre-selected periods of times. Similarly, system management task 306 may be a garbage collection procedure that may be scheduled to occur at preselected times.

After creating the schedule of tasks, active scheduler 310 may perform a feasibility analysis on the schedule of tasks. The feasibility analysis is an evaluation of the schedule of tasks to determine whether tasks can be performed and the order in which the tasks can be performed. In an illustrative embodiment, active scheduler 310 schedules the tasks originating from application task 308 and identifies periods of decreased activity. A period of decreased activity is a block of time where data processing system 300 is not scheduled to perform an application task.

Active scheduler 310 may then schedule a system management task from system management task 306 for execution during the period of decreased activity. For those tasks that may be completed incrementally, such as garbage collection, an increment of the task may be scheduled to be performed in the period of decreased activity. Thus, a garbage collection task may be dispatched when no application tasks are being performed.

The performance of the feasibility analysis on the schedule of tasks forms a prioritized schedule of tasks 314. Prioritized schedule of tasks 314 is an ordered schedule of tasks formed from the tasks of system management task 306 and application task 308. Active scheduler 310 may use prioritized schedule of tasks 314 to dispatch tasks of system management task 306 that need to be performed by data processing system 300. Active scheduler 310 generates prioritized schedule of tasks 314 by referencing policies stored in scheduling policy database 316.

Active scheduler 310 may reference scheduling policy database 316 while performing the feasibility analysis. Scheduling policy database 316 is a database storing a set of rules governing the scheduling of tasks to form prioritized schedule of tasks 314. Scheduling policy database 316 may include policies governing the assignment of priorities to various tasks from application task 308 and system management task 306 based upon the type of task, the importance of the task, an amount of time that the task may require to complete, or any other parameter or criterion. The assigned priorities may cause active scheduler 310 to determine when a task should be performed, if at all. Using these scheduling policies, active scheduler 310 may generate prioritized schedule of tasks 314.

Scheduling policy database 316 also facilitates the handling of asynchronous event task 318. Asynchronous event task 318 is a set of system management tasks and/or application tasks that occur without warning and which cannot be predicted. Thus, for example, where application 304 controls the movement of a rudder on an airplane, an asynchronous event task may cause the rudder to turn when the specified event occurs.

Asynchronous event task 318 may also include system management tasks that are scheduled to complete on an incremental basis. For example, system management tasks which may be scheduled as an asynchronous event task may include, without limitation, incremental garbage collection, incremental compilation, incremental file defragmentation, and incremental file integrity scanning. Active scheduler 310 may schedule an incremental system management task as an asynchronous event task in the event that active scheduler 310 identifies decreased system activity. Thus, garbage collection may be scheduled for the period of time when the system is inactive despite the fact that the garbage collection task may not have an opportunity to complete.

In an illustrative example, scheduling policy database 316 defines one or more minimum inter-arrival time rules for scheduling asynchronous event task 318. Minimum inter-arrival time rules are rules that describe the minimum period of time, which exists between successive iterations of the task. Thus, for example, a minimum inter-arrival time rule may specify that a particular event associated with asynchronous event task 318 may occur at most 100 times per second. As such, active scheduler 310 may schedule asynchronous event task 318 into prioritized schedule of tasks 314 using maximum number of possible occurrences.

In this illustrative embodiment in FIG. 3, asynchronous event handler 320 is an event handler that registers asynchronous event task 318 with active scheduler 310. During the registration process, asynchronous event handler 320 provides active scheduler 310 with execution details of the tasks that form asynchronous event task 318. Active scheduler 310 may then use the execution details to determine if tasks from asynchronous event task 318 may be scheduled and when. Active scheduler 310 may reference scheduling policy database 316 to determine whether the tasks from asynchronous event task 318 may preempt a scheduled task of prioritized schedule of tasks 314. The preemption may be determined from the relative priorities that active scheduler 310 assigned to the tasks with reference to scheduling policy database 316.

In an illustrative embodiment, a programmer of application 304 defines the various events that may be generated by application 304. In particular, the programmer specifies information regarding the period and duration of the sub-processes of application 304 running on data processing system 300. Registration module 312 registers application task 308 with active scheduler 310. Active scheduler 310 then creates a schedule of tasks that includes application task 308 and system management task 306.

Thereafter, active scheduler 310 performs a feasibility analysis on the schedule of tasks to form prioritized schedule of tasks 314. Prioritized schedule of tasks 314 is a schedule specifying an order for the tasks that are to be completed. Completion of the tasks may be constrained by one or more policies specified by scheduling policy database 316.

Active scheduler 310 may receive asynchronous event task 318 while dispatching events according to prioritized schedule of tasks 314. Upon receipt of asynchronous event task 318, active scheduler 310 confers with scheduling policy database 316 to determine whether asynchronous event task 318 preempts the next scheduled task in prioritized schedule of tasks 314. If the next task is preempted, then active scheduler 310 dispatches asynchronous event task 318. If the next task is not preempted, then active scheduler 310 schedules asynchronous event task 318 by incorporating asynchronous event task into prioritized schedule of tasks 314.

In an illustrative embodiment, results of a feasibility analysis may be presented to a user for review. Thus, if active scheduler 310 is unable to schedule a particular task into prioritized schedule of tasks 314, then active scheduler 310 may present a user feedback describing the encountered difficulties or deficiencies. For example, active scheduler 310 can provide a user feedback of the maximum allocation rate that can be reasonably sustained given the registered tasks in the schedule of tasks. Consequently, the system may be redesigned if necessary so that tasks may be assigned to separate processors, additional memory may be procured, or a faster CPU may be installed.

Figure 4:
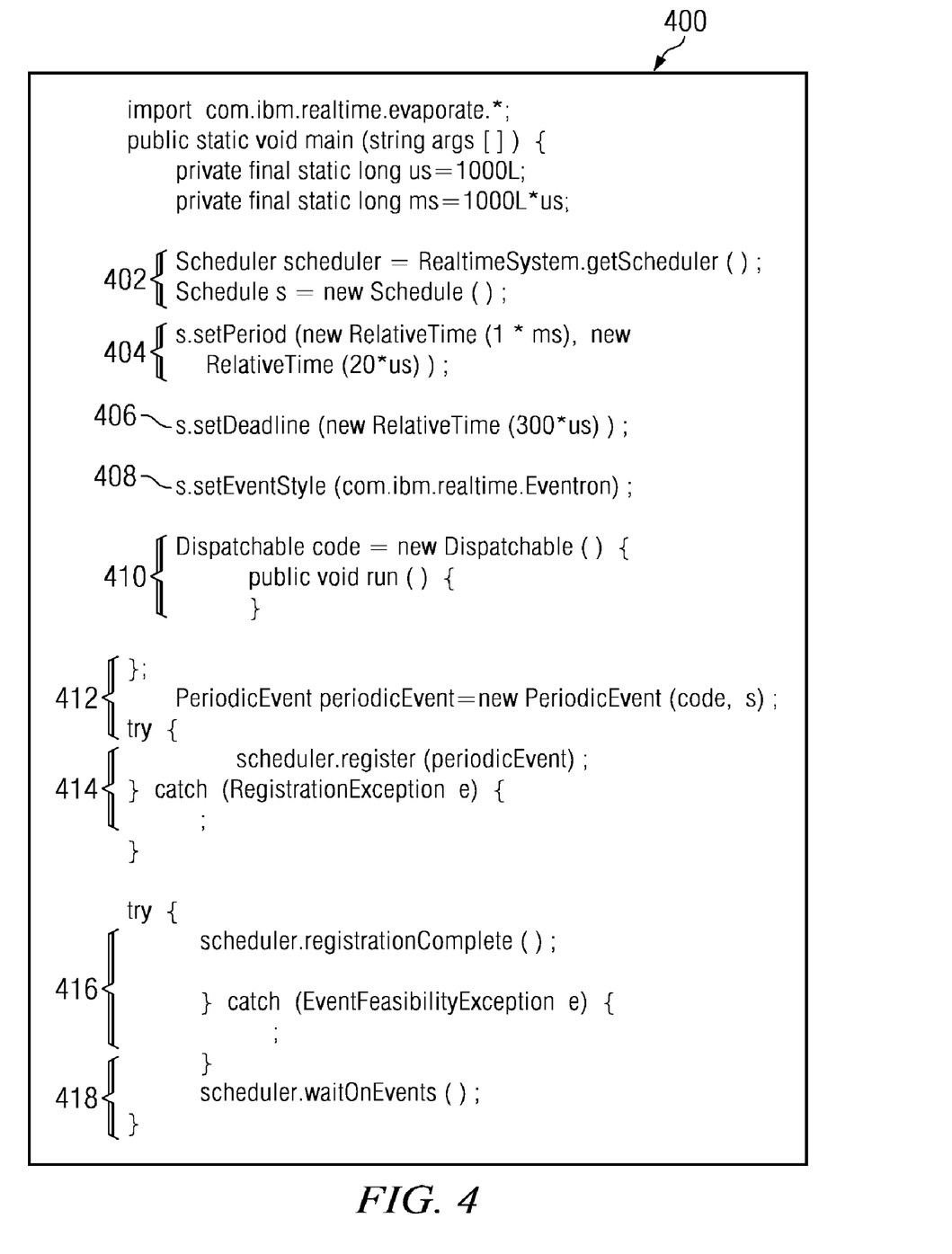
FIG. 4 is an exemplary computer code for registering application tasks with an active scheduler for use in managing system resources, in accordance with an illustrative embodiment.

FIG. 4 is code defining a class for a registering application tasks with an active scheduler, in accordance with an illustrative embodiment. The code may be incorporated in a registration module, such as registration module 312 in FIG. 3. In this illustrative embodiment in FIG. 4, registration code 400 may be executed to register application tasks with an active scheduler, such as active scheduler 310 in FIG. 3.

Registration code 400 includes code section 402 for creating an instance of a schedule s for use in managing system resources.

Code section 404 of registration code 400 sets a period and tolerance for the tasks of schedules. In this illustrative example, code section 404 specifies a period of 1 ms with a 20 μs tolerance.

Code section 406 of registration code 400 sets a deadline for the completion of tasks of schedule s. In this example, the deadline is set to 300 μs.

Registration code 400 includes code section 408 for specifying Eventrons. Eventrons are a programming construct that can arbitrarily preempt the garbage collector and guarantees safety and allows its data to be visible to the garbage-collected heap.

Code section 410 specifies the application code for execution. In this illustrative example, code section 410 must complete within the 300 μs deadline set in code section 406. Thus, for example, application code for updating global positioning satellite coordinates would be specified in code section 410 and complete within 300 μs. Code section 412 creates the event that will be dispatched, in accordance with the period set in code section 404. Code section 414 registers a task in schedule s. Code section 416 notifies an active scheduler that the registration is complete. The active scheduler is a scheduler such as active scheduler 310 in FIG. 3. Code section 418 prevents function represented by application code 400 from terminating until all the registered tasks have completed.

Figure 5:
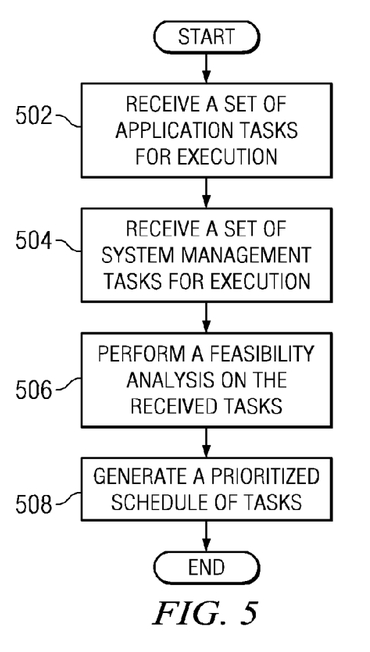
FIG. 5 is a flowchart of a process for generating a prioritized schedule of tasks to manage system resources, in accordance with an illustrative embodiment.

FIG. 5 is a flowchart of a process for generating a prioritized schedule of tasks to manage system resources, in accordance with an illustrative embodiment. The process may be performed by a software component, such as active scheduler 310 in FIG. 3.

The process begins by receiving a set of application tasks for execution (step 502). The process also receives a set of system management tasks for execution (step 504).

The process performs a feasibility analysis on the received tasks (step 506). The feasibility analysis may be performed with reference to a scheduling policy, such as scheduling policy database 316 in FIG. 3. The feasibility analysis is discussed in more detail in FIG. 6.

The performance of the feasibility analysis enables the process to generate a prioritized schedule of tasks (step 508) and the process terminates thereafter.

Figure 6:
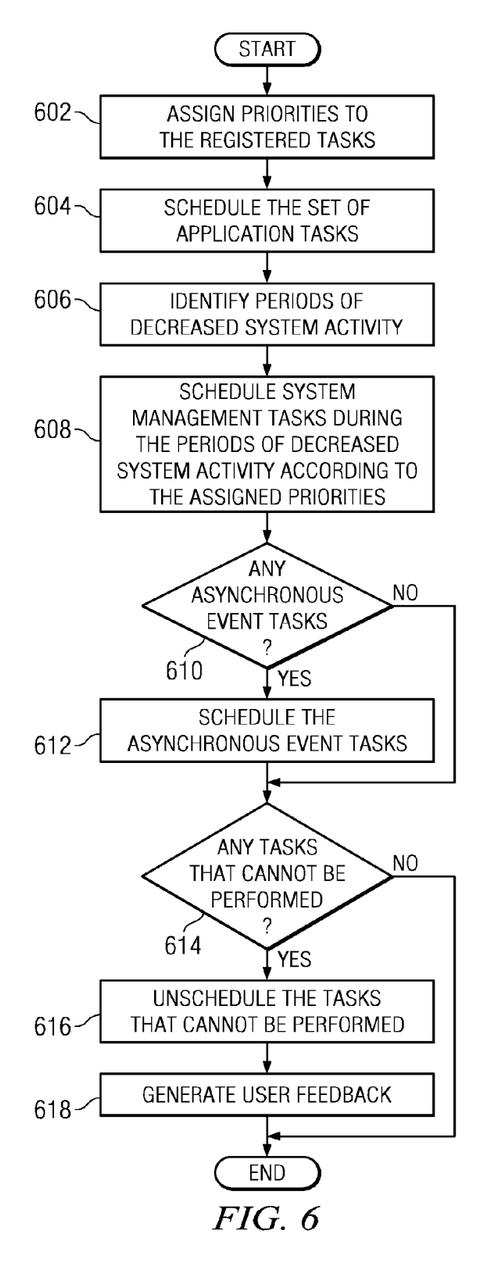
FIG. 6 is a flowchart of a process for performing a feasibility analysis, in accordance with an illustrative embodiment.

FIG. 6 is a flowchart of a process for performing a feasibility analysis, in accordance with an illustrative embodiment. The process may be performed by a software component such as active scheduler 310 in FIG. 3.

The process begins by assigning priorities to the registered tasks (step 602). The priorities may be assigned to the tasks of the schedule of tasks according to a scheduling policy, such as scheduling policy database 316 in FIG. 3.

The registered tasks include the set of application tasks and system management tasks received in steps 502 and 504 in FIG. 5, above. The process then schedules the set of application tasks (step 604) and identifies periods of decreased system activity (step 606). The periods of decreased system activity are the periods of time when the data processing system is not scheduled to process any application tasks. Thereafter, the process schedules system management tasks during the periods of decreased system activity according to the assigned priorities (step 608).

The process then makes the determination as to whether any asynchronous event tasks exist (step 610). Asynchronous event tasks may be application tasks and/or system management tasks. If the process makes the determination that asynchronous event tasks exist, then the process schedules the asynchronous event tasks (step 612). In an illustrative embodiment, the process may schedule the asynchronous event tasks according to a minimal inter-arrival time policy set forth in a scheduling policy database, such as scheduling policy database 316 in FIG. 3.

The process then makes the determination as to whether there are any tasks from the scheduled tasks that cannot be performed (step 614). If the process makes the determination that there are tasks from the schedule of tasks that cannot be performed, then the process unschedules the tasks that cannot be performed (step 616) and generates user feedback (step 618). The user feedback provides information to a user regarding the tasks that cannot be scheduled, and the reasons why the tasks cannot be scheduled. The process terminates thereafter.

Returning to step 614, if the process makes the determination that there are no tasks from the schedule of tasks which cannot be performed, then the process terminates. With reference again to step 610, if the process makes the determination that asynchronous event tasks do not exist, then the process returns to step 614.

Figure 7:
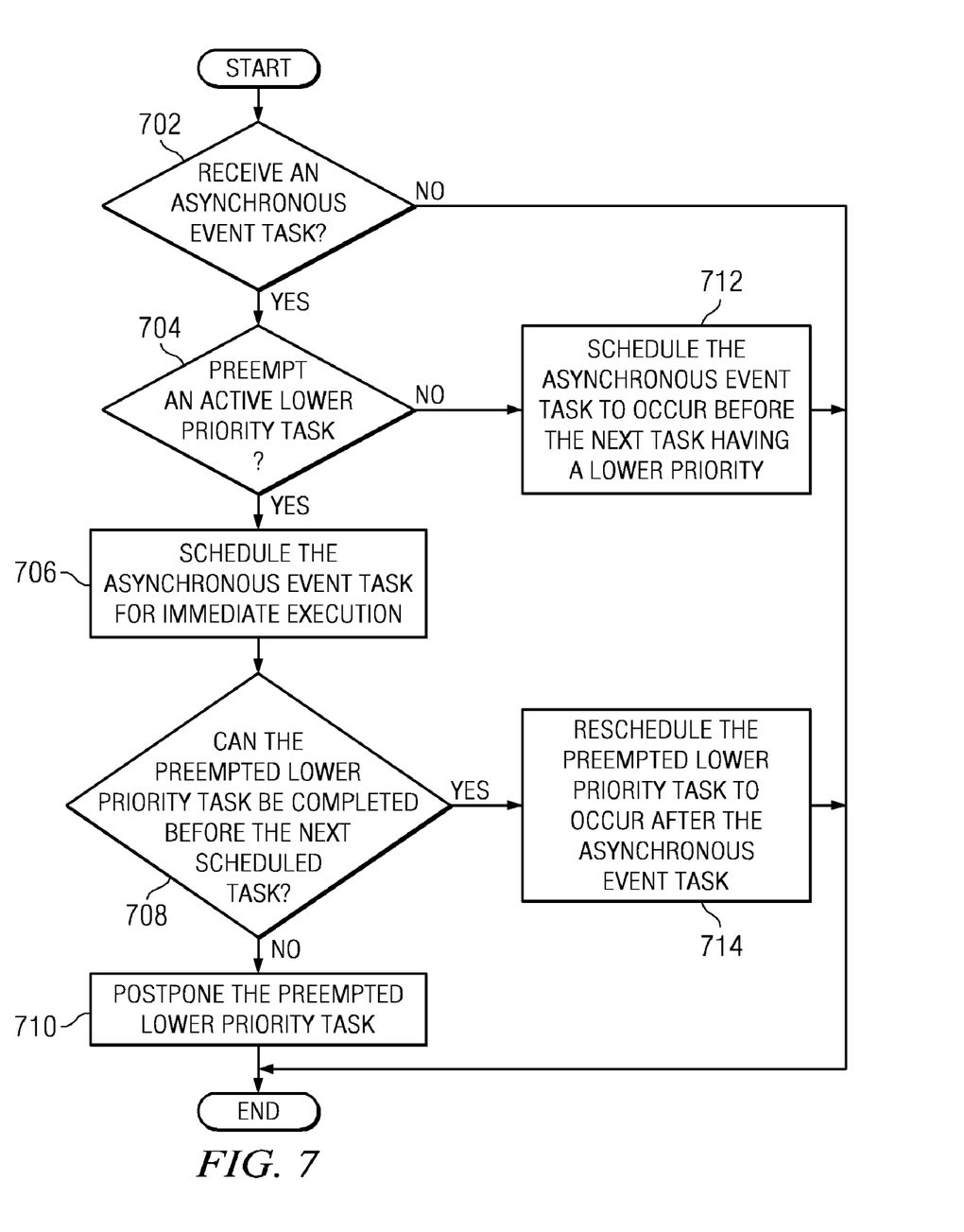
FIG. 7 is a flowchart of a process for scheduling asynchronous event tasks, in accordance with an illustrative embodiment.

FIG. 7 is a flowchart of a process for scheduling asynchronous event tasks in accordance with an illustrative embodiment. The process may be performed by a software component such as active scheduler 310 in FIG. 3.

The process begins by making the determination as to whether an asynchronous event task has been received (step 702). If the process makes the determination that no asynchronous event task has been received, then the process terminates. However, if the process makes the determination that an asynchronous event task has been received, then the process makes the determination as to whether the received asynchronous event task preempts an active lower priority task (step 704).

If the process makes the determination that the received asynchronous event task preempts an active lower priority task, then the process schedules the asynchronous event task for immediate execution (706). The process then makes the determination as to whether the preempted lower priority task can be completed before the next scheduled task (step 708). If the process makes the determination that the preempted lower priority task cannot be completed before the next scheduled task, then the process postpones the preempted lower priority task (step 710). The postponed task may still execute on the next interval. The process terminates thereafter.

Returning now to step 704, if the process makes the determination that the received asynchronous event task does not preempt an active lower priority task, then the process schedules the asynchronous event task to occur before the next task having a lower priority (step 712). The process terminates thereafter.

Returning to step 708, if the process makes the determination that the preempted lower priority task can be completed before the next scheduled task, then the process reschedules the preempted lower priority task to occur after the completion of the received asynchronous event task (step 714). The process terminates thereafter.

The flowcharts and block diagrams in the different depicted embodiments illustrate the architecture, functionality, and operation of some possible implementations of methods, apparatus, and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the illustrative embodiments described herein provide a computer implemented method, apparatus, and computer usable program product for managing system resources. The process schedules a set of application tasks to form a schedule of tasks in response to receiving the set of application tasks from a registration module. The process then performs a feasibility analysis on the schedule of tasks to identify periods of decreased system activity. Thereafter, the process schedules a set of system management tasks during the periods of decreased system activity to form a prioritized schedule of tasks.

Using the method and apparatus disclosed herein, application tasks and system management tasks may be registered with an active scheduler that may then generate a prioritized schedule of events for completing tasks that require system resources. Because the active scheduler is aware of all the tasks that must be performed, the active scheduler may then schedule the application tasks that must be performed and interleave system management tasks during periods of decreased processing activity. The system management tasks may be interleaved so that they are performed incrementally. Thus, performance of system management tasks will not require that the data processing system cease processing application tasks.

Features that may occur with the method and apparatus disclosed herein pertains to the feedback that may be generated by the active scheduler after performing the feasibility analysis. Feedback enables the systems designer to determine whether the underlying hardware or system is capable of performing the necessary tasks. Consequently, the system may be redesigned if necessary so that tasks may be assigned to separate processors, additional memory may be procured, or a faster CPU may be installed.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for system management, the computer implemented method comprising:
   responsive to receiving a set of application tasks from a registration module during application run-time, registering the set of application tasks and a set of system management tasks to form a schedule of tasks based on a set of policies stored in a policy database,
   wherein the set of policies comprises a type of a task, an importance of the task, and a probable time to complete the task,
   wherein the set of application tasks comprises a set of one or more sub-processes of an application to perform in order to execute the application, and
   wherein the set of system management tasks comprises a set of one or more tasks performed to maintain and manage system resources and facilitate operation of an operating system and the application;

performing a feasibility analysis on the schedule of tasks to evaluate the schedule of tasks to:

determine if the schedule of tasks can execute within constraints specified in the set of policies, and determine an order to execute the schedule of tasks by, identifying periods of decreased system activity, wherein the periods of decreased activity comprises of blocks of time within the schedule of tasks where no application task is currently scheduled to execute, within which to order the schedule of tasks to execute a system management task within the set of system management tasks;

generating a prioritized schedule of tasks to execute in order based on the feasibility analysis that identifies an order for completing each task in the prioritized schedule of tasks;

wherein priorities are assigned to each task in the prioritized schedule of tasks according to a scheduling policy; and wherein the set of system management tasks further comprises at least one of garbage collection and compiling.

2. The computer implemented method of claim 1, further comprising:

responsive to receiving an asynchronous event task with a higher priority than a scheduled task on the prioritized schedule of tasks, preempting the scheduled task having a lower priority.

3. The computer implemented method of claim 1 wherein the set of application tasks and the set of system management tasks are scheduled during the generation of the prioritized schedule of tasks according to a set of execution details, and wherein the execution details comprise a period of a task in the schedule of tasks and a duration of the task in the schedule of tasks.

4. The computer implemented method of claim 1, wherein the prioritized schedule of tasks further identifies a period of execution for completing each task in the prioritized schedule of tasks.

5. The computer implemented method of claim 1, further comprising:

presenting results of the feasibility analysis to a user.

6. A computer program product comprising:

computer recordable storage media including computer usable program code for system management, the computer program product comprising:

computer usable code for registering a set of application tasks and a set of system management tasks during application run-time to form a schedule of tasks based on a set of policies stored in a policy database, wherein the set of policies comprises a type of a task, an importance of the task, and a probable time to complete the task, wherein the set of application tasks comprises a set of one or more sub-processes of an application to perform in order to execute the application, and wherein the set of system management tasks comprises a set of one or more tasks performed to maintain and manage system resources and facilitate operation of an operating system and the application;

computer usable code for performing a feasibility analysis on the schedule of tasks to evaluate the schedule of tasks to:

determine if the schedule of tasks can execute within constraints specified in the set of policies, and determine an order to execute the schedule of tasks by, identifying periods of decreased system activity, wherein the periods of decreased activity comprises of blocks of time within the schedule of tasks where no application task is currently scheduled to execute, within which to order the schedule of tasks to execute a system management task within the set of system management tasks;

generating a prioritized schedule of tasks to execute in order based on the feasibility analysis that identifies an order for completing each task in the prioritized schedule of tasks;

wherein priorities are assigned to each task in the prioritized schedule of tasks according to a scheduling policy; and wherein the set of system management tasks further comprises at least one of garbage collection and compiling.

7. The computer program product of claim 6, further comprising:

computer usable program code for preempting the scheduled task having a lower priority in response to receiving an asynchronous event task with a higher priority than a scheduled task on the prioritized schedule of tasks.

8. The computer program product of claim 6, wherein the set of application tasks and the set of system management tasks are scheduled during the generation of the prioritized schedule of tasks according to a set of execution details, and wherein the execution details comprise a period of a task in the schedule of tasks and a duration of the task in the schedule of tasks.

9. The computer program product of claim 6, wherein the prioritized schedule of tasks further identifies a period of execution for completing each task in the prioritized schedule of tasks.

10. The computer program product of claim 6, further comprising:

presenting results of the feasibility analysis to a user.

11. An apparatus comprising:

a processor unit comprised of at least one processor connected to a memory storing program code, wherein the processor unit executes the program code comprising:

a registration module, wherein the registration module registers a set of application tasks during application runtime; and an active scheduler, wherein the active scheduler generates a prioritized schedule of tasks from the set of application tasks and a set of system management tasks, the active scheduler, performing a feasibility analysis on a schedule of tasks created from the set of application tasks and the set of system management tasks based on a set of policies stored in a policy database to determine if the schedule of tasks can execute within constraints specified in the set of policies stored in the database and to determine an order to execute the schedule of tasks in, identifying periods of decreased system activity, wherein the periods of decreased activity comprise blocks of time within the schedule of tasks where no application task is scheduled to execute, within which the active scheduler orders the schedule to execute a system management task within the set of system management tasks, and generating a prioritized schedule of tasks to execute in order based on the feasibility analysis that identifies an order for completing each task in the prioritized schedule of tasks;

wherein priorities are assigned to each task in the prioritized schedule of tasks according to a scheduling policy; and wherein the set of system management tasks comprises at least one of garbage collection and compiling.

12. The apparatus of claim 11, further comprising:
an asynchronous event handler, wherein the asynchronous event handler registers a set of asynchronous event tasks.

13. The apparatus of claim 11, further comprising:
a scheduling policy database, wherein the scheduling policy database stores a set of rules for assigning priorities to tasks in the prioritized schedule of tasks.

14. An apparatus for managing system resources, the apparatus comprising:
a bus system,
memory connected to the bus system, wherein the memory includes computer usable program code; and
a processing unit connected to the bus system, wherein the processing unit executes the computer usable program code to register a set of application tasks during application run-time and a set of system management tasks to form a schedule based on a set of policies stored in a policy database,
wherein the set of policies comprises a type of a task, an importance of the task, and a probable time to complete the task,
wherein the set of application tasks comprises a set of one or more sub-processes of an application to perform in order to execute the application, and
wherein the set of system management tasks comprises a set of one or more tasks performed to maintain and manage system resources and facilitate operation of an operating system and the application; and
perform a feasibility analysis on the schedule of tasks to determine if the schedule of tasks can execute within constraints specified in the set of policies stored in the database and to:
determine an order to execute the schedule of tasks by, identifying periods of decreased system activity, wherein the periods of decreased activity comprise blocks of time within the schedule of tasks where no application task is scheduled to execute, within which the active scheduler orders the schedule to execute a system management task within the set of system management tasks; and
generate a prioritized schedule of tasks to execute in order based on the feasibility analysis that identifies an order for completing each task in the prioritized schedule of tasks;
wherein priorities are assigned to each task in the prioritized schedule of tasks according to a scheduling policy; and
wherein the set of system management tasks further comprises at least one of garbage collection and compiling.

* * * * *